United States Patent
Kumagami

(10) Patent No.: US 6,298,020 B1
(45) Date of Patent: Oct. 2, 2001

(54) FOCUS SEARCH METHOD AND CONTROLLER FOR DIGITAL DISK

(75) Inventor: Yusuke Kumagami, Iwaki (JP)

(73) Assignee: Alpine Electronics, Inc., Tokyo (JP)

( * ) Notice: Subject to any disclaimer, the term of this patent is extended or adjusted under 35 U.S.C. 154(b) by 0 days.

(21) Appl. No.: 09/478,771

(22) Filed: Jan. 6, 2000

(30) Foreign Application Priority Data

Jan. 21, 1999 (JP) .................................................. 11-013003

(51) Int. Cl.⁷ ....................................................... G11B 7/09
(52) U.S. Cl. ................................ 369/44.27; 369/44.32; 369/94; 369/53.28
(58) Field of Search ........................... 369/44.11, 44.12, 369/44.29, 44.23, 44.25, 44.26, 44.27, 44.28, 44.32, 47.1, 47.11, 53.1, 53.28, 93, 94, 112.01

(56) References Cited

U.S. PATENT DOCUMENTS

| | | |
|---|---|---|
| 5,682,372 | 10/1997 | Yamakawa et al. . |
| 5,696,743 | 12/1997 | Kwasaki . |
| 5,740,136 | 4/1998 | Tsutsui et al. . |
| 5,835,460 | 11/1998 | Nishikata . |
| 5,920,527 | 7/1999 | Aoki . |
| 6,091,680 | * 7/2000 | Matsuda et al. ............... 369/44.27 X |
| 6,147,942 | * 11/2000 | Abe et al. .......................... 369/44.27 |
| 6,163,512 | * 12/2000 | Jeun .................................. 369/44.29 |

* cited by examiner

*Primary Examiner*—Muhammad Edun
(74) *Attorney, Agent, or Firm*—Brinks Hofer Gilson & Lione

(57) ABSTRACT

A focus search method and a controller for a digital disk overcomes a shortcoming of a conventional focus search method in which a focus search on a specified layer is always performed from the same direction if a layer jump for changing a layer has been improperly performed during reproduction from a digital disk such as a DVD having a plurality of recording layers, thus taking much time for the focus search when the focus search is begun from a point away from a specified layer. A focus direction used for an immediately preceding focus search performed from an initial focus search position at the outer side of two recording layers is stored in a focus direction memory of a focus direction setter. Based on the data stored in the memory and a signal indicating the position of a specified layer received from a layer specifier that instructs a layer jump, a setter for handling an improper focus jump makes settings so that a focus search is started from a side closer to the specified layer by performing a logical operation and a flow processing.

24 Claims, 11 Drawing Sheets

FOCUS SEARCH METHOD AND CONTROLLER FOR DIGITAL DISK

BACKGROUND OF THE INVENTION

1. Field of the Invention

The present invention relates to a focus search method of performing a focus search for matching a position of each recording layer of a digital disk such as a DVD with a focal position of an optical beam, and a controller for implementing the method. The digital disk is used for recording and reproducing information by employing an optical beam, and has a plurality of recording layers.

2. Description of the Related Art

Hitherto, in the case of a digital disk for recording and reproducing information by using an optical beam, pits are formed in a surface of the digital disk to record information. To reproduce the recorded information from the digital disk, focus control for focusing an optical beam on a recording layer is carried out. In order to expand storage capacity, digital disks such as DVDs have come to be used. As shown in FIG. 11, this type of digital disk is equipped with a plurality of recording layers produced by forming a second recording layer 62 on a substrate 61, forming a transparent intermediate layer 63 on a surface of the second recording layer 62, forming a first recording layer 64 on a surface of the intermediate layer 63, and further forming a transparent protective layer 65 on a surface of the first recording layer 64.

To reproduce information from the digital disk set forth above, focus control is conducted in which the position of an object lens 66 is controlled to focus optical beams coming through the object lens 66 onto a specified recording layer. For the focusing control, it has been well known to use optical detectors that are symmetrically disposed with respect to an optical axis to separately detect the quantities of light of the optical beams that return through the object lens 66. A signal indicating a difference between the quantities of light of the optical beams incident upon the two optical detectors is processed and output as, for example, a focus error signal as shown in FIG. 12. Based on this signal, the position of the object lens is adjusted.

More specifically, when the object lens is first moved to shift the focus thereof from an initial position, namely, point A, at the rear of a recording layer 67, toward the second recording layer 62 on the front side as shown, for example, in FIG. 11, no focus error signal will be detected by the optical detectors if there is a large defocus. When the object lens has moves to a predetermined distance or shorter, the positive quantity of light received on one optical detector increases with a resultant gradual increase in amplitude given as an output. In an example shown in FIG. 12, the amplitude reaches its peak at a point of 8 µm (−8 µm) at the rear of the recording layer. Thereafter, as the focus gradually approaches the recording layer, the level of the signal indicating the difference between the two optical detectors decreases because the quantity of light received by the other detector of the two detectors increases. The moment the focus reaches the recording layer, the quantities of light received by the two detectors become equal, and the amplitude representing the differential signal accordingly reaches zero, producing a zero-crossing state.

After that, as the focus moves from the second recording layer 62 toward the front side, the negative quantity of light received by the other detector increases. The increase reaches its peak also at a point of 8 µm (+8 µm) on the front side of the recording layer. Thereafter, as the focus further approaches the front side, the quantity of received light decreases until the detectors finally can no longer receive the beam, causing the focus error signal to become zero. The intermediate layer 63 is normally approximately 40 µm thick, so that it is hardly influenced by the first recording layer 64. Feedback control is carried out in accordance with such a focus error signal so as to carry out the focus control by moving the object lens to a position where the value of the signal reaches the zero-crossing. The focus control for the first recording layer 64 is conducted in the same manner as that for the second recording layer 62.

The focus control based on the focus error signal set forth above in a digital disk such as a DVD provided with a plurality of recording layers is conducted as follows. In the disk shown in FIG. 11, for instance, of the two recording layers 67 of the disk, the focus is first moved to an initial position, namely, point A, farther from the second recording layer 62 facing the substrate 61. Then, the focus is gradually moved toward the front as observed from the object lens. A recording layer is identified by recognizing a first focus error signal obtained as a signal from the second recording layer 62 and a signal thereafter as a signal from the first recording layer 64, and the focus control on the identified recording layer can be implemented. Conversely, the focus may be first moved to an initial position, namely, point B on the front side from the first recording layer 64 located farther from the substrate 61, of the two layers of the recording layer 67. Then, the focus is gradually moved toward the rear as observed from the object lens. A recording layer is identified by recognizing a focus error signal which is obtained first as a signal from the first recording layer 64 and a signal thereafter as a signal from the second recording layer 62, and the focus control on the identified recording layer can be implemented.

Reproduction from a digital disk having two recording layers (hereinafter referred to as "layers") as described above is performed as follows. For instance, as illustrated in FIG. 13, the focus is first moved to point A, namely, the initial position at the rear of the disk, and if an external reproduction instruction indicates reproduction from the second layer 62 formed on the surface of the substrate 61, the focus control is carried out in a position where the first focus error signal was output. After that, if an instruction indicating reproduction from the first layer 64 located farther from the substrate 61 is received, then drive control of "layer jump" to the first layer 64 is carried out and control for focusing on the first layer 64 is conducted.

However, when performing the layer jump, there are cases wherein a scratch on the layer prevents a proper focus error signal from being obtained. There are also cases wherein no focus error signal is obtained if the drive control of the layer jump is excessively quick with resultant overshoot of a lens and a range of a focus error signal output shown in FIG. 12 in the jump layer is exceeded. In addition to such a layer jump failure, there is a defocus problem in which focus control fails to be properly carried out on the layer to jump onto, and focusing cannot be achieved even after the control is continued. If these failures take place, the focus is returned to point A, which is the initial position, in order to carry out control for focusing on the first layer 64 as shown in FIG. 13. This applies also to a layer jump to the second layer 62 when the initial position of the focus is set at point B on the front side of the substrate 61. FIG. 13 is a drawing for illustrating a layer jump; an optical axis of an optical beam does not laterally move in actual use.

Always returning to the initial position before re-focusing on a predetermined layer after an improper layer jump problem, such as a layer jump failure or defocus, takes place has posed the shortcomings described below. As in the example, for instance, when the initial position of the focus is point A at the rear side of the substrate and if a layer jump target is the first layer 64 located farther from the substrate, then the jump takes more time. Moreover, it is necessary to perform signal processing for canceling a focus error signal that is input when the second layer 62 is first passed, then to verify passing of the second layer 62 and thereafter to implement signal processing to input the focus error signal from the first layer 64. This has led to disadvantages of complicated processing circuitry, more processing time required, and a failure to achieve quicker layer jumps. The same shortcomings are observed also in the case wherein the initial position of the focus is set at point B at the front side of the substrate 61. This also applies to the case where more than two layers are formed as recording layers.

SUMMARY OF THE INVENTION

Accordingly, it is an object of the present invention to provide a focus search method for a digital disk that makes it possible to achieve quick focusing on a target layer without requiring complicated circuitry if a layer jump among recording layers is not performed properly during reproduction from a digital disk having a plurality of recording layers, and a controller for implementing the method.

To this end, according to a first aspect of the present invention, there is provided a focus search method for a digital disk, which includes the steps of: moving the focus of an emitted light beam close to a recording layer from an outer side of either of two recording layers of a digital disk in which at least two recording layers, namely, a first layer and a second layer, are formed; receiving a reflected light beam from the digital disk; carrying out control to focus the received light beam on a specified layer, and performing a layer jump in response to an instruction indicating a layer change; wherein focusing control is carried out from the same direction only if a layer jump to the first layer has been improperly performed when an immediately preceding focus search was started from an outer side of the first layer, or only if a layer jump to the second layer has been improperly performed when an immediately preceding focus search was started from an outer side of the second layer.

According to a second aspect of the present invention, there is provided a focus search method for a digital disk which includes the steps of first focusing an emitted light beam at an initial position on an outer side of any of the recording layers of a digital disk in which a plurality of recording layers are formed; moving the focus close to a recording layer side; receiving a reflected light beam from the digital disk; carrying out control to focus the received light beam on a specified layer; and performing a layer jump in response to an instruction indicating a layer change; wherein, if an improper layer jump has taken place, focusing control is carried out from the same side only for a layer jump to a layer on the initial position side at the time of immediately preceding focusing control.

According to a third aspect of the present invention, there is provided a focus search method for a digital disk which includes the steps of bringing the focus of an emitted light beam close to a recording layer from an outer side of any of the recording layers of a digital disk in which a plurality of recording layers are formed; receiving a reflected light beam from the digital disk; carrying out control to focus the received light beam on a specified layer; and performing a layer jump in response to an instruction indicating a layer change; wherein, if a layer jump has been performed improperly, then an exclusive logical OR of a flag corresponding to a focusing direction and a flag corresponding to a layer specified for a jump is computed to set a next focusing direction.

According to a fourth aspect of the present invention, there is provided a focus search method for a digital disk which includes the steps of first focusing an emitted light beam at an initial position on an outer side of either of two recording layers of a digital disk in which a plurality of recording layers are formed; moving the focus close to a recording layer side to receive a reflected light beam from the digital disk; carrying out control to focus the received light beam on a specified layer; and performing a layer jump in response to an instruction indicating a layer change; wherein, if a layer jump has been performed improperly, then an exclusive logical OR of a flag corresponding to an initial focus position and a flag corresponding to a layer specified for a jump is computed to set a next initial focus position.

According to a fifth aspect of the present invention, in the focus search method according to any one of the first to fourth aspects of the present invention, when the digital disk is started, the focusing control is started from an outer side of a recording layer near a specified layer.

According to a sixth aspect of the present invention, there is provided a focus search controller for a digital disk that is provided with: focusing control means for moving the focus of an emitted light beam close to a recording layer side from an outer side of either of two recording layers of a digital disk in which at least two recording layers, namely, a first layer and a second layer, are formed and for receiving a reflected light beam from the digital disk to carry out control to focus the received light beam on a specified layer; and layer jump means for performing a layer jump in response to an instruction indicating a layer change, further including layer jump control means for carrying out focusing control from the same direction only if a layer jump to the second layer has been improperly performed when an immediately preceding focus search was started from an outer side of the second layer, or only if a layer jump to the first layer has been improperly performed when an immediately preceding focus search was started from an outer side of the first layer.

According to a seventh aspect of the present invention, there is provided a focus search controller for a digital disk which is provided with: digital disk focusing control means for focusing an emitted light beam first at an initial position on an outer side of either of two recording layers of a digital disk in which a plurality of recording layers are formed, and moving the focus close to a recording layer side so as to receive a reflected light beam from the digital disk and to carry out control to focus the received light beam on a specified layer, and layer jump means for performing a layer jump in response to an instruction indicating a layer change, further including layer jump control means for carrying out focusing control from the same side only for a layer jump to a layer on the initial position side during immediately preceding focusing control if an improper layer jump has taken place.

According to an eighth aspect of the present invention, there is provided a focus search controller for a digital disk which is provided with focusing control means for bringing the focus of an emitted light beam close to a recording layer from an outer side of any of the recording layers of a digital disk, in which a plurality of recording layers are formed, for receiving a reflected light beam from the digital disk, and for carrying out control to focus the received light beam on a specified layer, and layer jump means for performing a layer jump in response to an instruction indicating a layer change, the controller further including focus direction setting means for computing an exclusive logical OR of a flag corresponding to a focusing direction and a flag corresponding to a layer specified for a jump to set a next focusing direction if a layer jump has been performed improperly.

According to a ninth aspect of the present invention, there is provided a focus search controller for a digital disk that is provided with focusing control means for focusing an emitted light beam first at an initial position on an outer side of either of two recording layers of a digital disk in which a plurality of recording layers are formed, for moving the focus close to a recording layer side so as to receive a reflected light beam from the digital disk, and for carrying out control to focus the received light beam on a specified layer, and layer jump means for performing a layer jump in response to an instruction indicating a layer change, further including means for setting a first flag corresponding to an initial position of the focus, means for setting a second flag corresponding to a layer specified for a jump, computing means for computing an exclusive logical OR of the two flags, and initial focus position setting means for setting a next initial focus position on the basis of a computation result.

According to a tenth aspect of the present invention, there is provided a focus search controller for a digital disk according to any one of the sixth to ninth aspects of the present invention, which is provided with means for specifying an initial position at a startup for carrying out focusing control from an outer side of a recording layer near a specified layer.

DESCRIPTION OF THE PREFERRED EMBODIMENTS

Figure 1:
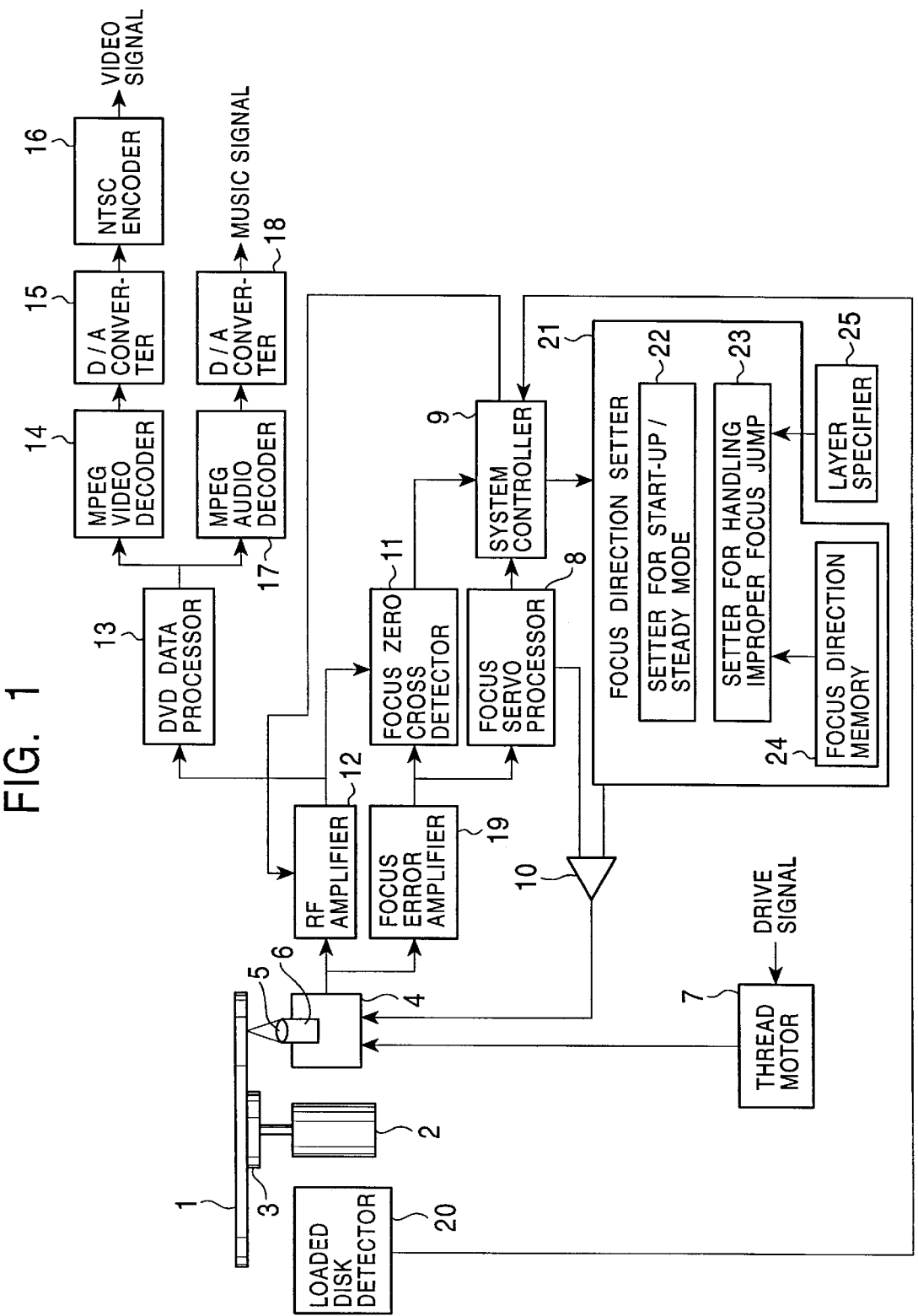
FIG. 1 is a block diagram of an embodiment of a disk player in which the present invention can be used.

Embodiments of the present invention will be described in conjunction with the accompanying drawings. FIG. 1 shows a block diagram of a digital disk player and its controller for implementing a focus search method for a digital disk in accordance with the present invention. A digital disk 1, in which a plurality of recording layers (layers) are formed as mentioned above, is fixed to a table 3 turned by a spindle motor 2 and rotationally controlled at a predetermined speed. For the digital disk 1, an optical pickup 4 is disposed so that it opposes a recording layer formed on the bottom surface of the digital disk 1 in the drawing. A semiconductor laser beam that comes into a focus at a predetermined point through an object lens 5 from the optical pickup 4 is emitted, and a laser beam reflected from the digital disk 1 is received by a photodiode again through the object lens 5.

The object lens 5 of the optical pickup 4 is adapted to be vertically moved with respect to the digital disk 1 by a focus actuator 6 thereby to focus on a recording layer. The optical pickup 4 can be moved in a direction parallel to the surface of the digital disk 1 by a thread motor 7 drivingly controlled by a thread motor drive signal so as to conduct tracking control.

Figure 12:
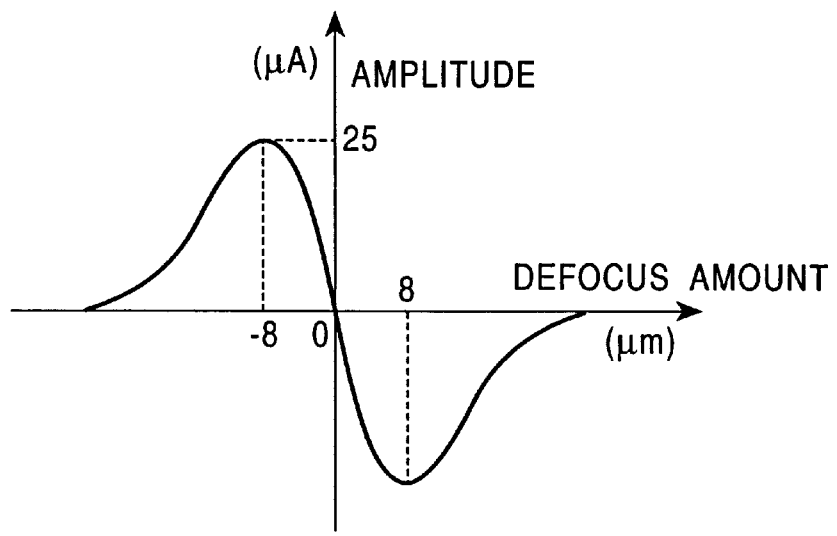
FIG. 12 is a graph showing a focus error signal.
Figure 13:
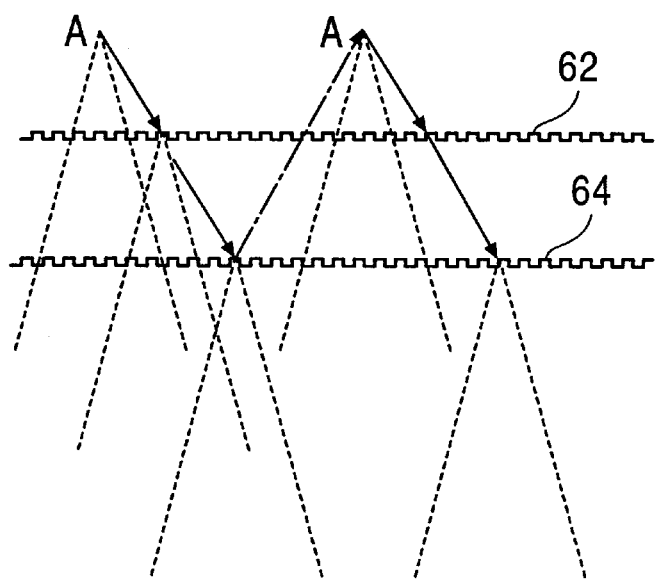
FIG. 13 is a schematic representation illustrating a conventional focus search performed when a layer jump has been performed improperly.

A signal issued from the optical pickup 4 is applied to a focus error amplifier 19 which generates and amplifies a focus error signal as shown in FIG. 12 mentioned above. The focus error signal is applied to a focus servo processor 8 which produces a signal necessary for focus servo by compensating a phase of a high-pass component or amplifying a low-pass component, and the produced signal is further amplified to generate a voltage required for driving a focus actuator driver 10. The focus actuator driver 10 energizes a focus coil of the focus actuator 6 in the optical pickup 4 on the basis of a drive voltage applied by the focus servo processor 8, thereby vertically moving the object lens 5 with respect to a signal recording surface of the digital disk 1. The focus actuator driver 10 receives data corresponding to a focusing direction from a focus direction setter 21, which will be discussed in detail hereinafter, and controls the focus actuator 6.

A focus error signal from the focus error amplifier 19 is applied to a focus zero crossing detector 11 that detects a zero crossing point at which the focus error signal of FIG. 12 from the focus error amplifier 19 becomes zero when the amplitude of a signal from an RF amplifier 12 that amplifies a signal from the optical pickup 4 by a predetermined degree of amplitude takes a predetermined value or more, and detects that a laser beam is focused on a recording layer. The system controller 9 receives signals of the focus zero crossing detector 11, the focus servo processor 8, a loaded disk detector 20, etc. to control the entire disk player, including the degree of amplitude of the RF amplifier which is set primarily according to whether the detected digital disk is a CD or a DVD. The system controller 9 supplies data regarding the state of the digital disk player, namely, a startup mode, a steady operation mode, a focus error mode, or the like to a focus direction setter 21.

Furthermore, the focus direction setter 21 is provided with a setter 22 for startup/steady mode that makes settings for carrying out a focus search from a direction, which has been decided in advance, at a startup from a halt mode or during a steady mode operation, and a setter 23 for handling an improper focus jump that sets a next focus direction according to a predetermined method which will be described later. Thus, the focus direction setter 21 detects the state of the digital disk player on the basis of the signals from the system controller 9, and outputs a predetermined focus direction signal to the focus actuator driver 10.

The focus direction setter 21 is equipped with a focus direction memory 24 that updates last data among set focus directions, i.e., the data of an immediately preceding focus direction, and stores the updated data, which is supplied to the setter 23 for handling an improper focus jump (hereinafter referred simply as "setter 23"). The setter 23 receives a signal from a layer specifier 25, the signal being based on a specification by an external source or the controller, and it sets a focus direction on the basis of signals from the focus direction memory 24 and the layer specifier 25 when an improper focus jump has taken place. Each operation in the focus direction setter 21 will be described later in conjunction with FIG. 2.

A DVD data processor 13 demodulates MPEG data on the basis of signals issued from the RF amplifier 12, and also performs various types of digital signal processing such as correcting an error, separating MPEG video data and MPEG audio data, and extracting address information. An MPEG video decoder 14 decodes image data of MPEG2 on the basis of the MPEG video data that has been separated by the DVD data processor 13. The decoded video data is supplied to a digital-to-analog converter 15 wherein a luminance signal Y and color difference signals Cb and Cr are produced. Furthermore, an NTSC encoder 16 creates an NTSC, which is a video signal, from the luminance signal and the color difference signals. The MPEG audio decoder 17 decodes music data of MPEG2 on the basis of the MPEG audio data separated by the DVD processor 13. The decoded music data is converted to an analog music signal through the digital-to-analog converter 18.

Figure 2:
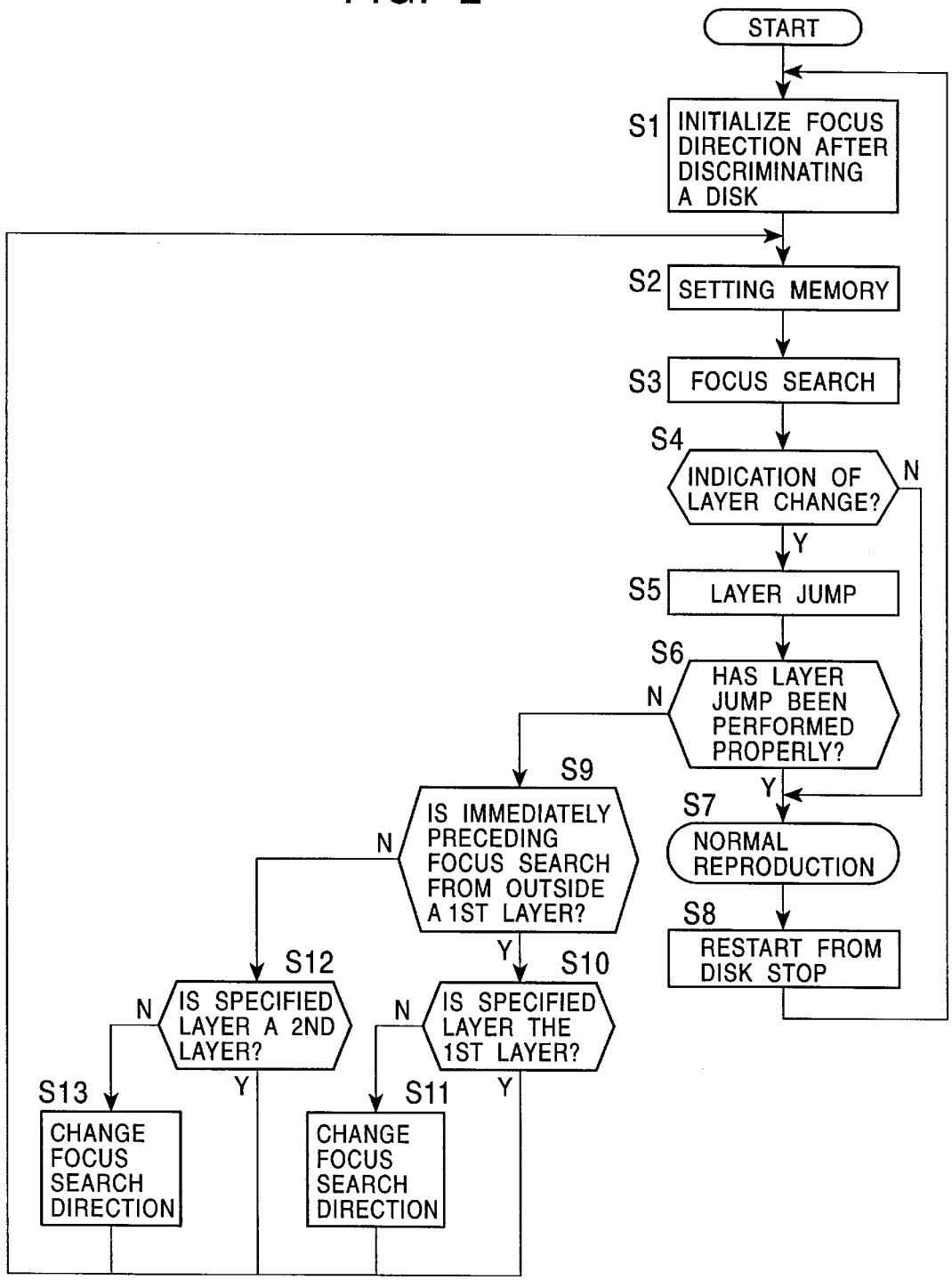
FIG. 2 is a flow chart illustrating one embodiment in accordance with the present invention.

In the digital disk player and the controller thereof configured as set forth above, a focus search in accordance with the present invention is performed according to the schematic flow shown in FIG. 2. More specifically, when the digital disk player is started up from a halt mode, the system controller determines by a known means whether a digital disk loaded in the disk player is a CD, a DVD, or other type, and whether there are a plurality of recording layers or how many recording layers there are if it is a DVD or the like. Based on a result of the determination, an initial setting for a predetermined focus direction is made in step S1.

Figure 3A:
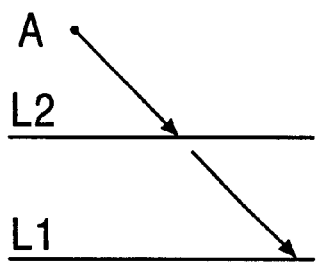
FIG. 3 is a schematic representation illustrating one embodiment of a focus search in accordance with the present invention.
Figure 11:
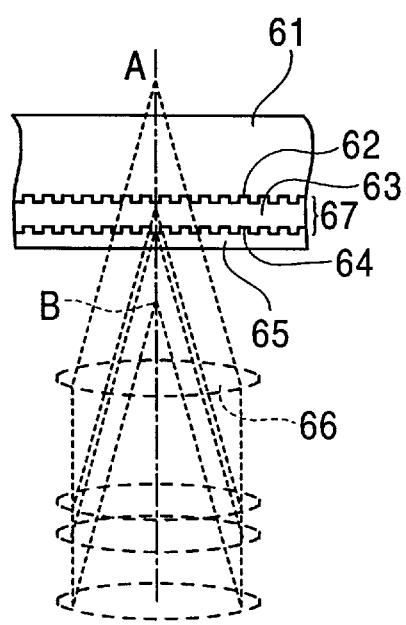
FIG. 11 is a schematic representation illustrating a focus search of a disk player provided with two recording layers.

At this time, as shown in FIG. 3, for example, in a digital disk player having a second layer L2 corresponding to the second layer 62 formed on the substrate 61 in FIG. 11 mentioned above, and a first layer L1 corresponding to the first layer 64 located farther at the front side than the second layer L2, it is possible to perform initialization so that a focus search is always performed toward the front side from point A, which is defined as a first initial position set farther at the rear side than the second layer L2, i.e. toward the first layer from the outer side of the second layer as illustrated in FIG. 3A. At this time, a focus search on the first layer is carried out as follows. After it is confirmed that the second layer has been passed, a beam is focused on the next first layer to conduct the focus search. It is also possible to perform initialization so that a focus search is always performed from a farther front side than the first layer L1, i.e. from point B, which is defined as a second initial position, i.e. toward the second layer from the outer side of the first layer as illustrated in FIG. 3B.

Figure 3C:
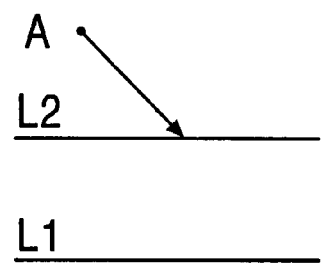
Figure 3B:
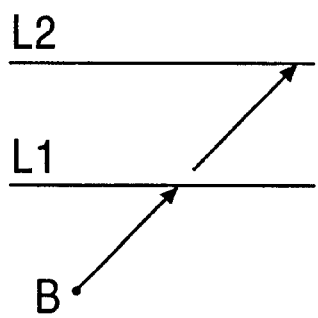
Figure 3D:
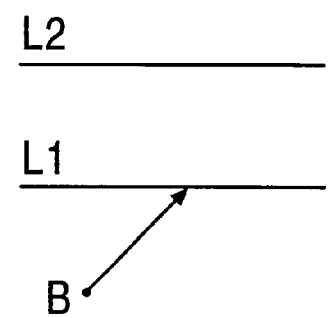

Further alternatively, it is possible to perform initialization so that a focus search is started from an initial focus search position closer to a specified reproduction layer as illustrated in FIGS. 3C and 3D. In other words, if an instruction indicates reproduction from the layer L2, then the focus search is begun from point A; if an instruction indicates reproduction from the layer L1, then the focus search is begun from point B. This arrangement shortens the time required for a focus search on the layers and also obviates the necessity for a circuit for verifying that a layer has been passed. If it has been determined that the loaded digital disk is a disk such as a CD that has only a single recording layer, then initialization is performed so that a focus search is begun from either point A or point B decided in advance.

When the focus direction at a startup is initialized as described above, the focus direction setting data is stored in step S2 of FIG. 2. The setting is stored in a focus direction memory 24 of the focus direction setter 21 in FIG. 1. Thereafter, a focus search is carried out in step S3. As illustrated in FIG. 1, the initialized focus direction setting signal from the setter 22 for the startup/steady mode and a signal from the focus servo processor 8 are sent to the focus actuator driver 10, and the focus search is implemented on the basis of these signals.

After the focus search is performed, it is determined in step S4 whether reproduction from another layer has been prompted by an external instruction or a signal from an internal control circuit. If it is determined that no instruction indicating a layer change has been received, then normal reproduction is implemented in step S7. If, however, it is determined that an instruction indicating a layer change has been received, then a layer jump to a specified layer is performed in step S5. Thereafter, it is determined whether the layer jump has been accomplished properly. To be more specific, if a proper focus signal cannot be obtained due to a scratch or the like on the target layer of the layer jump, it is determined that an improper layer jump has occurred, and the setter 23 in the focus direction setter 21 of FIG. 1 sets a focus direction as set forth below. Improper layer jumps include a failure in which a light receiving range of the layer has been exceeded attributable to improper layer jump drive control, or a defocus problem in which focusing cannot be accomplished on the target layer.

Figure 4A:
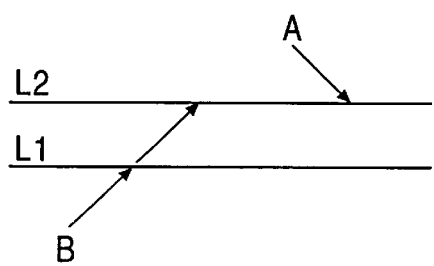
FIG. 4 is a schematic representation showing a direction in which a focus search should be performed if a layer jump has been performed improperly in the present invention.

More specifically, in step S9 of FIG. 2, it is determined whether an immediately preceding focus search was begun from an outer side of the first layer. For this purpose, the data stored in the aforesaid step S2 is used. This is illustrated in FIG. 4. FIG. 4A illustrates a case wherein the immediately preceding focus search was started from point B, which is the initial focus position at the outer side of the first layer L1, and a focus jump from the first layer L1 to the second layer L2 is performed. FIG. 4B illustrates a case wherein a focus search is performed first from point B at the outer side of the first layer L1, reproduction is performed from the second layer L2, then a layer change instruction indicating a layer jump to the first layer is received.

If a result of the determination in step S9 indicates that a focus search has been begun at the outer side of the first layer L1 as shown in FIGS. 4A and 4B, then it is further determined in step S10 whether the specified layer for the layer jump is the first layer. As a result, if the target layer for the layer jump is the second layer L2 as illustrated in FIG. 4A, then processing for changing the focus search direction is implemented in step S11. Accordingly, the next focus search is performed on the second layer L2 from point A, which is the initial focus position at the outer side of the second layer L2. Further, when a layer jump from the second layer L2 to the first layer L1 is performed as shown in FIG. 4B, the direction of the next focus search is not changed, so that the next focus search is performed on the first layer L1 from point B, which is the initial focus position at the outer side of the first layer L1.

Figure 4C:
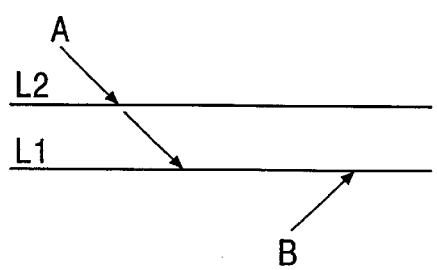
Figure 4B:
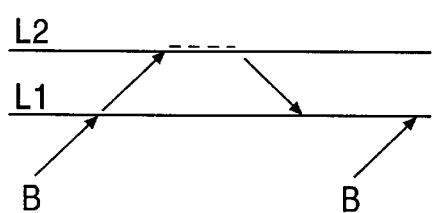
Figure 4D:
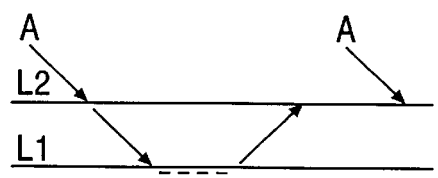

If the focus search has been performed from the outer side of the second layer L2 toward the first layer L1 as shown in FIGS. 4C and 4D, then a determination result obtained in step S9 will be NO ("N"). In this case, the program proceeds to step S12 wherein it decides whether the layer specified for a layer jump is the second layer. At this time, if the focus jump from the second layer L2 to the first layer L1 has been carried out improperly as shown in FIG. 4C, then the determination result will be "N", and the processing for changing the focus search direction is implemented in step S13. Furthermore, as shown in FIG. 4D, if a focus search is first carried out from point A, which is the initial focus position at the outer side of the second layer L2, normal reproduction from the first layer is performed, and a layer jump instruction indicating a focus search on the second layer L2 is received, then the determination result will be "Y". In this case, the focus search direction will not be changed, and the focus search will be performed from the same set direction as that stored in step S2. Thereafter, the same series of steps will be repeated. If, for example, three improper focus jumps take place in succession, processing such as interrupting the operation will be implemented. To make a restart in step S8 following a disk stop, the program proceeds to the point before step S1 to repeat the same operation described above.

Thus, when a focus search is carried out on the same layer because of an improper layer jump, focus search can be always started from a side nearer to a target layer of a layer jump, permitting a quicker focus search following the improper layer jump.

In the embodiment of FIG. 2, it has been determined in step S9 whether the immediately preceding focus search has been started from the outer side of the first layer. Alternatively, however, it may be determined in step S9 whether the immediately preceding focus search has been started from the outer side of the second layer, further determined in step S10 whether the specified layer is the second layer, and further determined in step S12 whether the specified layer is the first layer, leaving the rest of the flow unchanged. This arrangement is able to provide the same function as that set forth above.

Figure 5:
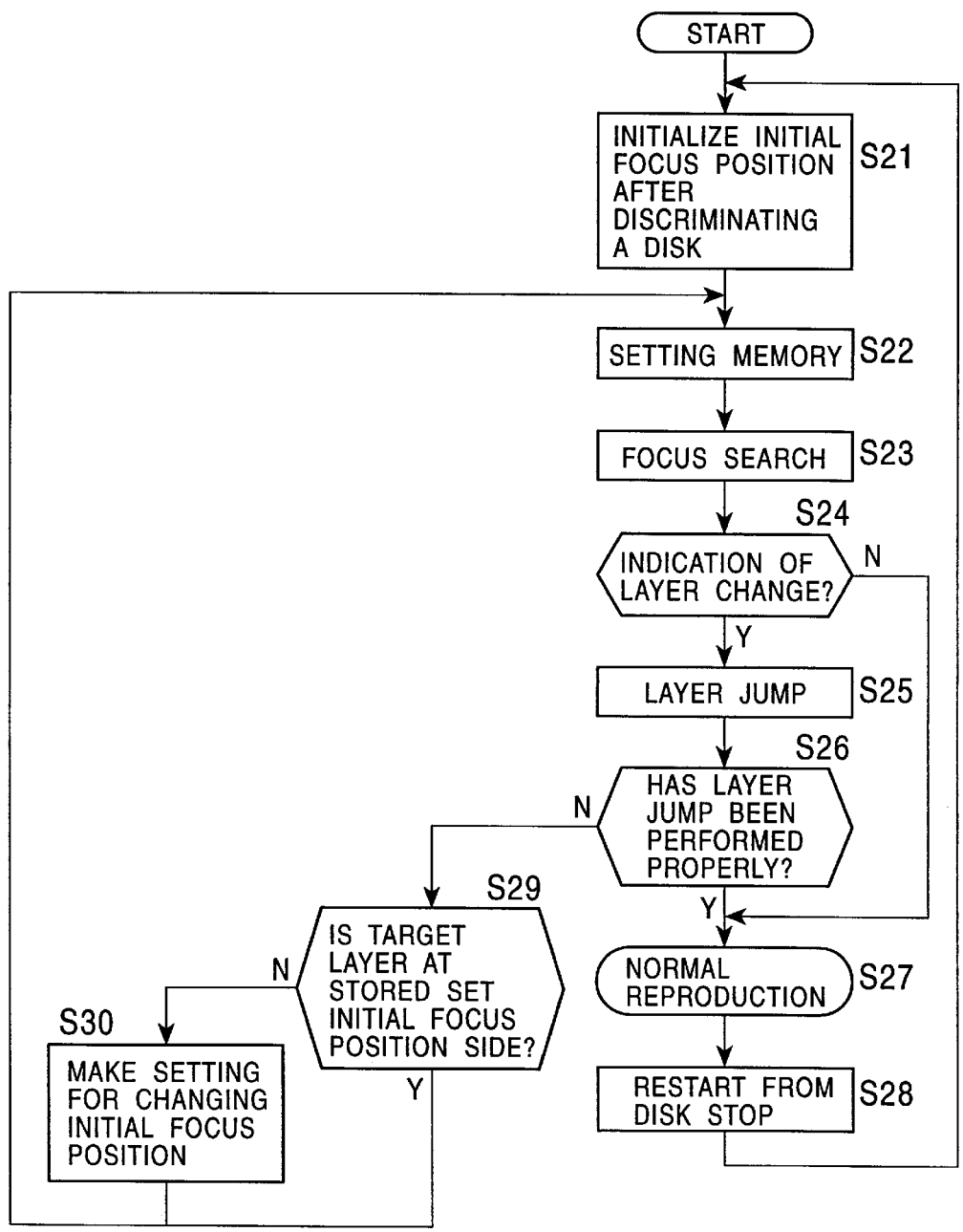
FIG. 5 is a flow chart illustrating another embodiment in accordance with the present invention.

In the embodiment described above, the procedure for deciding a focus search direction for achieving a quicker layer jump has been described step by step for each case in conjunction with the relationship between the immediately preceding focus search begun from the outer side of a recording layer and a layer specified for a layer jump in the case of an improper layer jump. Based on the initial focus position of the immediately preceding focus search, the procedure can be simplified by following a procedure shown in FIG. 5.

More specifically, as in the case of the flow illustrated in FIG. 2, a loaded disk is identified after the digital disk player is started, and a focus search is carried out from a predetermined direction depending on whether the disk has a single layer or multiple layers. For this purpose, the initial focus position is initialized in step S21, and an initial focus position decided beforehand is set. This will set the initial focus position at point A or point B, and a focus search will be begun from the set point as shown FIG. 3 and FIG. 4.

Hence, if point B is selected as the initial focus position, then the direction corresponds to the one from the outer side of the first layer in the embodiment. If point A is selected, then the direction corresponds to the one from the outer side of the second layer.

Thereafter, the set initial focus position is stored in step S22, and a focus search is carried out in step S23. If no instruction indicating a layer change is received, then normal reproduction is carried out in step S27; if an instruction indicating a layer change is received, then the program proceeds from step S24 to step S26, wherein whether the layer jump has been properly performed is determined, via step S25. Thus, the rest of the procedure is the same as the procedure of the embodiment.

If, however, it is determined in step S26 that the layer jump has been improperly performed, then the program proceeds to step S29 wherein it determines whether the specified target layer is on the side of the stored set initial focus position. If the determination result is YES ("Y"), then the set initial focus position will not be changed. More specifically, if an instruction indicating a layer jump to the first layer L1 is received when the immediately preceding focus search from the outer side of a recording layer was begun from point B, which is the initial focus position at the outer side of the first layer L1 as in the case of FIG. 4B, or if an instruction indicating a layer jump to the second layer L2 is received when the initial focus position was point A, which is on the outer side of the second layer L2 as in the case of FIG. 4D, then the program directly proceeds to a point before step S2 without changing the setting of the initial focus position, and carries out another focus search from the same side again.

If a determination result obtained in step S29 is "N" which means that the target layer is not on the side of the stored set initial focus position, then the program changes the setting of the initial focus position, and subsequently carries out a focus search from the opposite side. More specifically, if an instruction indicating a layer jump to the second layer L2 is received when the immediately preceding focus search from the outer side of a recording layer was begun from point B, which is the initial focus position at the outer side of the first layer L1 as in the case of FIG. 4A, or if an instruction indicating a layer jump to the first layer L1 is received when the initial focus position was point A, which is on the outer side of the second layer L2 as in the case of FIG. 4C, then the program makes setting to change the initial focus position in step S30, stores the setting in step S22, and carries out a focus search from the opposite side.

Figure 6:
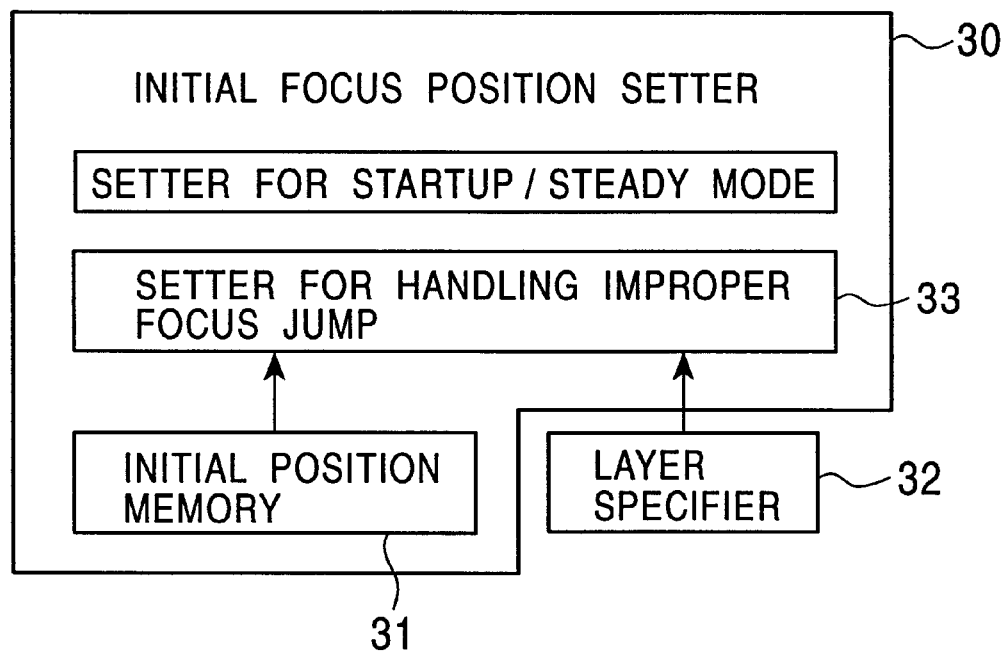
FIG. 6 is a diagram showing a configuration of a part of a controller for the embodiment shown in FIG. 5 in accordance with the present invention.

The focus search method set forth above can be implemented by employing a focus search controller that uses an initial focus position setter 30 shown in FIG. 6 in place of the initial focus position setter 21 in FIG. 1. More specifically, the initial focus position used when an immediately preceding focus search was carried out from the outer side of a recording layer is stored in an initial position memory 31. Based on the data regarding the initial position and the data regarding a layer specified for a layer jump instructed by a layer specifier 32, a setter 33 for handling an improper focus jump sends the initial focus position setting signal mentioned above to carry out a predetermined focus search.

Figure 7:
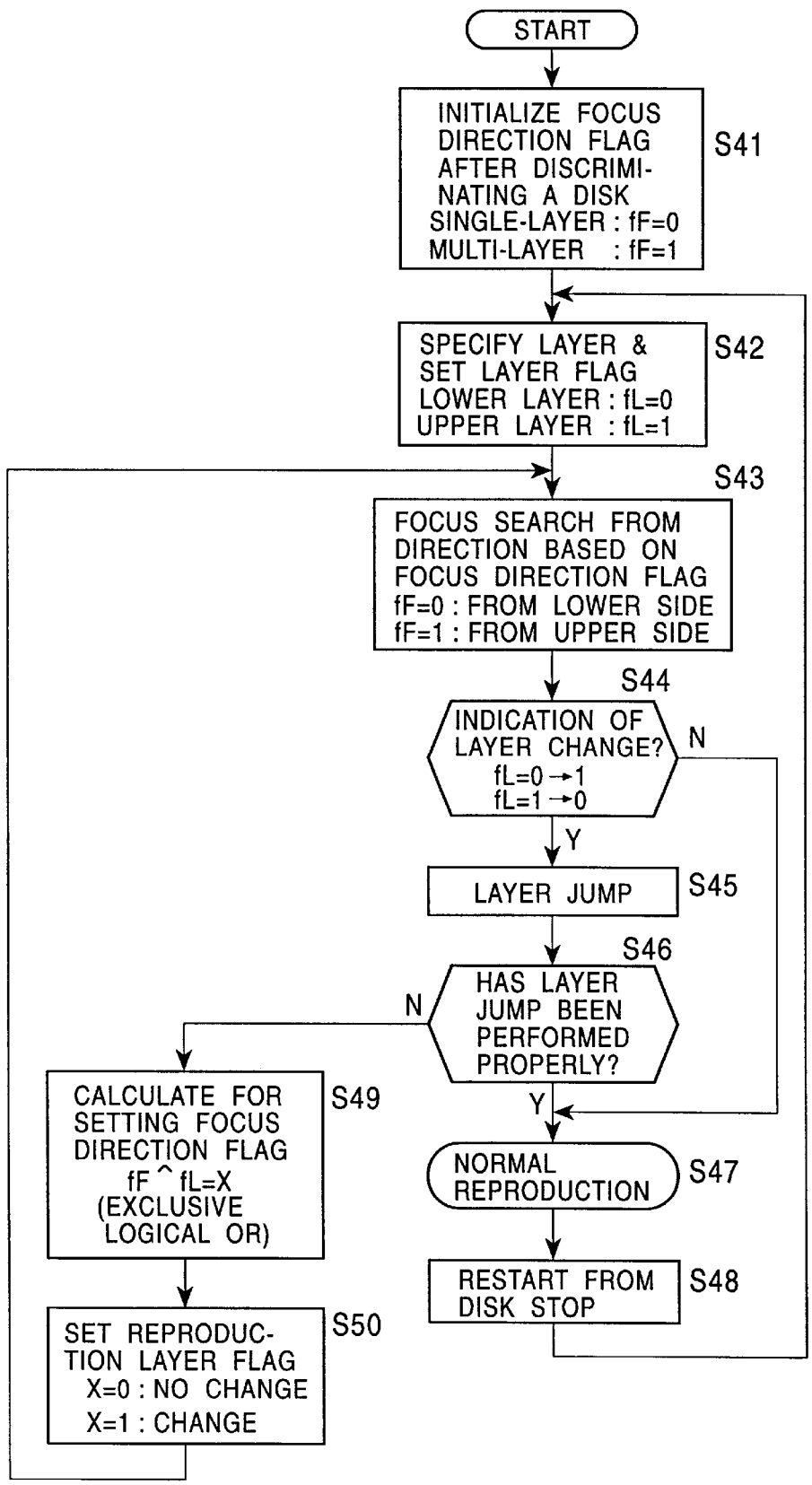
FIG. 7 is a flow chart illustrating still another embodiment in accordance with the present invention.

There is an alternative focus search method providing the function described above. As shown in FIG. 7, for example, a logical operation is performed using a focus direction flag fF and a flag fL of a layer specified for a layer jump thereby to set the direction of the next focus search if a layer jump has been carried out properly. To be more specific, in the flow chart shown in FIG. 7, the type of a digital disk loaded in a digital disk player is determined in step S41 as in the foregoing embodiments. Based on the determination result, the focus direction flag fF is initialized. At this time, for example, when there is a single layer as in the case of a CD, the focus direction flag is initialized to fF=0, whereas it is initialized to fF=1 when there are multiple layers as in the case of a DVD. When, for example, fF=0, a search is begun at point B, which is the initial focus search position at the outer side of the first layer L1 as illustrated in FIGS. 3B and 3D. Conversely, when fF=1, the search is begun at point A, which is the initial focus search position at the outer side of the second layer L2 as illustrated in FIGS. 3A and 3C. These settings can be reversed.

In the following description, as shown in FIGS. 3A and 3C, carrying out a focus search from point A, which is the initial focus search position at the outer side of the second layer L2, will be abbreviated as "a focus search from the upper side" or "a focus search toward the lower side" as necessary according to the mode shown in the drawing. Likewise, carrying out a focus search from point B, which is the initial focus search position at the outer side of the first layer L1, will be abbreviated as "a focus search from the lower side" or "a focus search toward the upper side" as necessary according to the mode shown in the drawing. The relationship between layers, however, is not limited to a vertical one; there is also, for example, a lateral layer relationship. Hence, the aforesaid expressions will be used for convenience of the description herein.

Referring to FIG. 7, following the aforesaid step S41, a layer from which reproduction is to be performed is specified in step S42. At this time, a layer flag is set for the specified layer. In the embodiment illustrated in FIG. 7, the lower layer, namely, the first layer L1 shown in FIG. 4 is set as fL=0, while the upper layer, namely, the second layer L2 is set as fL=1. A focus search is carried out on the specified layer from the direction corresponding to the focus direction flag in step S43. Thereafter, it is determined in step S44 whether a layer change instruction has been received. If no layer change instruction has been received, then the program proceeds to step S47 to perform normal reproduction.

If it is determined in step S44 that a layer change instruction has been received from outside or from an internal control circuit, then the program changes the setting to fL=1 if the layer flag has been set to fL=0, or to fL=0 if the layer flag has been set to fL=1, and the program carries out a layer jump in step S45. It is determined in step S46 whether the layer jump has been properly performed, and if the layer jump has been properly performed, then the program proceeds to step S47 to carry out normal reproduction. If, however, the layer jump has not been properly performed due to the causes mentioned above, then the program performs an operation to set the focus direction flag in step S49.

To carry out the operation in step S49, the operation of an exclusive logical OR of "fF" which is the flag indicating the direction of the immediately preceding focus search from the outer side of a recording layer and "fL" which is the flag indicating a layer specified for a layer change, i.e. the target layer of the layer jump, is performed. Based on an operation result X, the setting of the flag is changed in step S50. The exclusive logical OR of fF and fL is represented by "fF^fL", an established relationship being expressed as 1^0=1, 0^1=1, 0^0=0, and 1^1=0. In step S50, based on a value of X, which is a result of the operation, the flag for setting the search direction is not changed if X=0, so that the focus search is carried out in the same direction as the previous one, whereas if X=1, the flag is changed and the focus search is carried out from the opposite side.

The logical operation with the results set forth above will be described in conjunction with FIG. 4. Referring to FIG. 4A, when a layer jump to the second layer L2 is performed, fF=0 because the immediately preceding focus search from the outer side of the recording layer was carried out toward the upper side from point B on the lower side. fL=1 because the target layer of the layer jump is the upper side second layer L2; hence, fF^fL=0^1 and X=0^1=1. Therefore, as shown in step S50, the following focus direction flag is changed so that a search is carried out from the upper side toward the lower side, which is opposite from the case of the preceding search.

Referring now to FIG. 4B, the operation is performed as follows. When a layer jump to the first layer L1 is performed, fF=0 because the immediately preceding focus search from the outer side of the recording layer was carried out toward the upper side from point B on the lower side as in the foregoing case. fL=0 because the target layer of the layer jump is the lower side first layer L1; hence, fF^fL=0^0 and X=0^0=0. Therefore, the focus search direction is not changed, and a search is carried out from the lower side toward the upper side as in the preceding focus search.

Further referring to FIG. 4C, the operation is performed as follows. When a layer jump to the first layer L1 is performed, fF=1 because the immediately preceding focus search from the outer side of the recording layer was carried out toward the lower side from point A on the upper side. fL=0 because the target layer of the layer jump is the lower side first layer L1; hence, fF^fL=1^0 and X=1^0=1. Therefore, the focus search direction is changed, and the following search is carried out from the lower side toward the upper side.

Further referring to FIG. 4D, the operation is performed as follows. When a layer jump to the second layer L2 is performed, fF=1 because the immediately preceding focus search from the outer side of the recording layer was carried out toward the lower side from point A on the upper side as in the foregoing case. fL=1 because the target layer of the layer jump is the upper side second layer L2; hence, fF^fL= 1^1 and X=1^1=0. Therefore, the focus search direction is not changed, and the next search is carried out from the upper side toward the lower side as in the preceding focus search.

Figure 8:
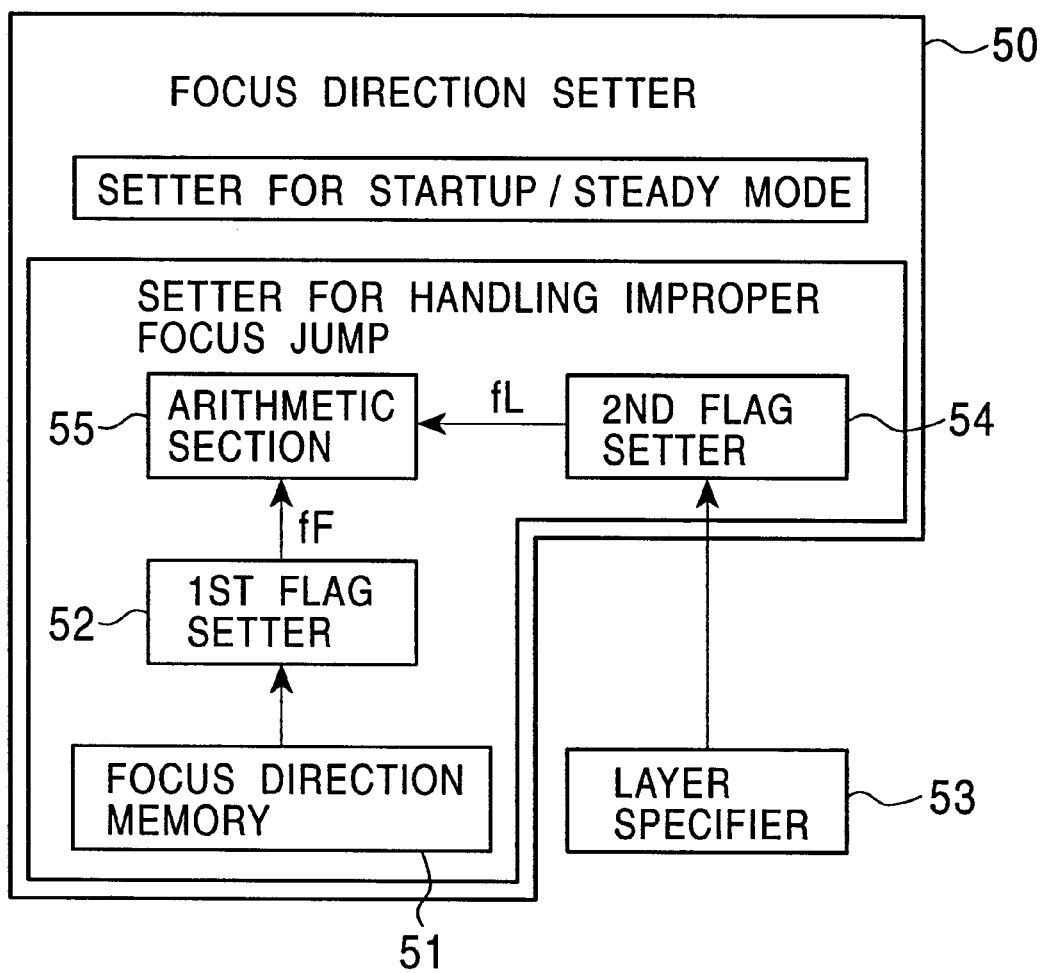
FIG. 8 is a diagram showing a configuration of a part of a controller for the embodiment shown in FIG. 7 in accordance with the present invention.

As set forth above, using the focus search direction flag and the layer flag for a layer jump permits a focus search from an appropriate direction to be accomplished merely by performing a simple logic operation. Such a focus search method can be implemented by adding no major change to the controller shown in FIG. 1; the method can be implemented simply by employing a focus direction setter 50 shown in FIG. 8 as the focus direction setter 21 of FIG. 1. More specifically, the direction of the immediately preceding focus search from the outer side of a recording layer has been stored in a focus direction memory 51, and a first flag setter 52 sets the focus direction flag fF according to the stored focus direction. Furthermore, as in the case of the above embodiment, a second flag setter 54 sets the layer flag fL in accordance with a layer instruction received from a layer specifier 53. The focus direction flag fF from the first flag setter 52 and the layer flag fL from the second flag setter 54 are supplied to an arithmetic section 55 to perform the aforesaid exclusive logical OR. Based on the result, it is determined whether the focus direction must be changed.

The data regarding the focus direction based on the result is supplied, together with a signal of the focus servo processor 8, to the focus actuator driver 10. Thereafter, the same procedure as previously described is taken.

Figure 9:
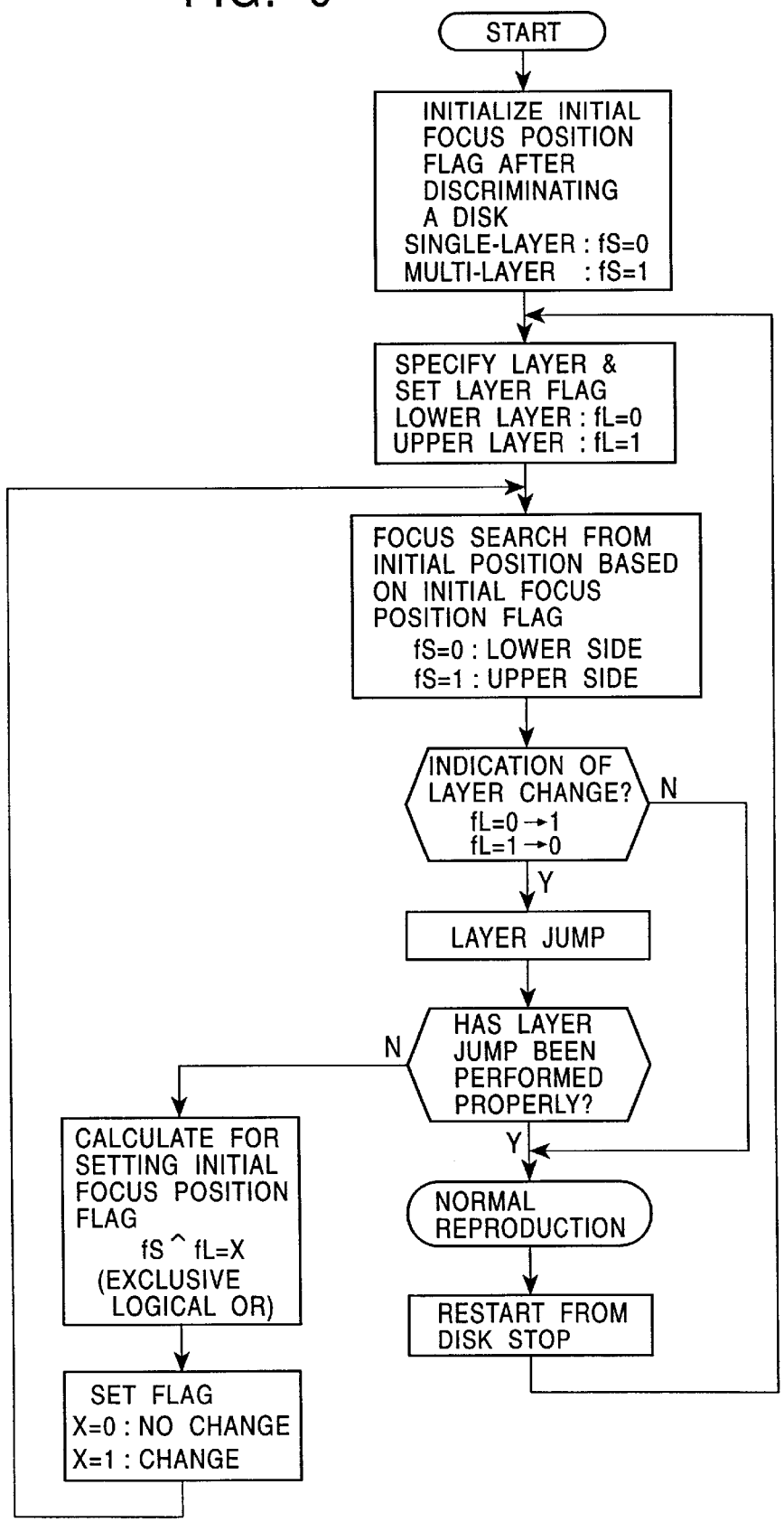
FIG. 9 is a flow chart illustrating a further embodiment in accordance with the present invention.
Figure 10:
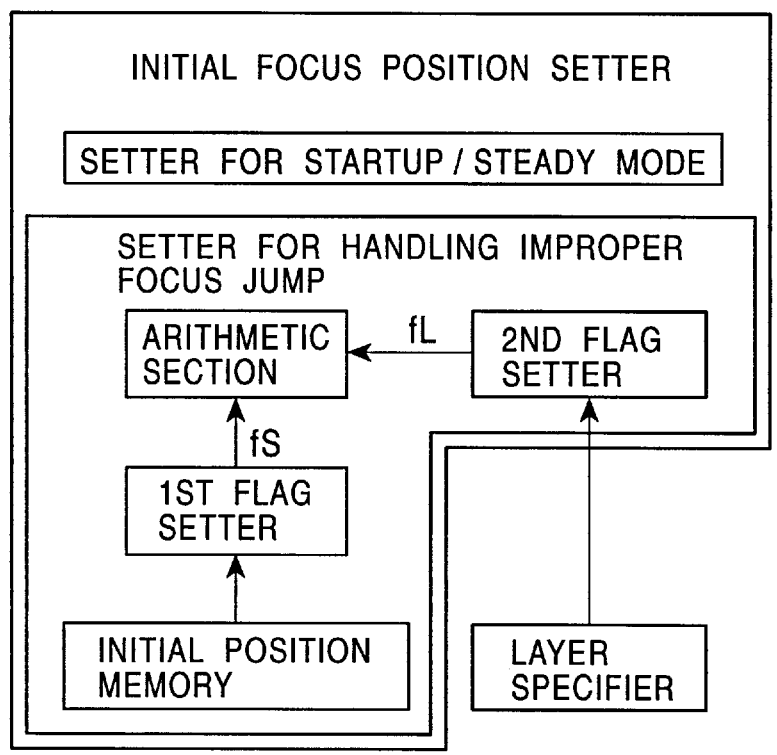
FIG. 10 is a diagram showing a configuration of a part of a controller for the embodiment shown in FIG. 9 in accordance with the present invention.

Alternatively, using a concept of the initial position of a focus search to represent the focus search direction, the same function as that set forth above can be attained by following the same flow as shown in FIG. 9 and by performing the logical operation. More specifically, as shown in FIG. 9, an initial focus position flag focus search is used in place of the focus direction flag fF in the flow of FIG. 7, and settings are made so that a focus search from point B, which is the lower initial focus position of the first layer L1, i.e., a focus search upward, is performed when fS=0, and a focus search from point A, which is the upper initial focus position of the second layer L2, i.e., a focus search downward, is performed when fS=1. For the rest, the same steps as those of the embodiment shown in FIG. 7 are implemented; hence, the description thereof will not be repeated. The same configuration as that of the controller of FIG. 8 may be used for a controller for implementing the focus search method, as a schematic configuration of its initial focus position setter is shown in FIG. 10.

Thus, examples have been shown in which focus searches can be performed from optimum directions when focus searches are repeated following improper layer jumps. All these examples show the focus search methods for implementing the focus search illustrated in FIG. 4 and units for implementing the methods. It is obvious that a variety of modes can be implemented based on the various concepts described above by modifying a part of the embodiments. Obviously, the present invention can be applied to a digital disk having more than two recording layers, e.g. four recording layers.

As described above, the present invention makes it possible to provide a focus method for a digital disk that permits quick focusing on a layer without complicated circuitry when a layer jump for moving between recording layers has been improperly conducted during reproduction from a digital disk having a plurality of recording layers, and to provide a controller for implementing the method.

Moreover, the data regarding the initial focus position in the immediately preceding focus search from the outer side of a recording layer is employed, permitting simplified processing. Furthermore, the logical operation based on flag settings enables a simpler control means to be achieved. In addition to the above features, a quicker focus search can be accomplished at a startup.

What is claimed is:

1. A focus search method for a digital disk, comprising the steps of:
   moving a focus of an emitted light beam close to a recording layer from an outer side of either of two recording layers of a digital disk in which at least two recording layers, namely, a first layer and a second layer, are formed;
   receiving a reflected light beam from the digital disk;
   carrying out control to focus the received light beam on a specified layer; and
   performing a layer jump in response to an instruction indicating a layer change;
   wherein focusing control is carried out from the same direction only if a layer jump to the first layer has been improperly performed when an immediately preceding focus search was started from an outer side of the first layer, or only if a layer jump to the second layer has been improperly performed when an immediately preceding focus search was started from an outer side of the second layer.

2. A focus search method for a digital disk according to claim 1, wherein focusing control is started from an outer side of a recording layer close to a specified layer at the time of starting up the digital disk.

3. A focus search method for a digital disk according to claim 2, wherein, if the digital disk has a single recording layer, focusing control is started from a predetermined side at the time of a startup.

4. A focus search method for a digital disk, comprising the steps of:
   first focusing an emitted light beam at an initial position at an outer side of either of two recording layers of a digital disk in which a plurality of recording layers are formed;
   moving the focus close to a recording layer side;
   receiving a reflected light beam from the digital disk;
   carrying out control to focus the received light beam on a specified layer; and
   performing a layer jump in response to an instruction indicating a layer change;
   wherein, if an improper layer jump has taken place, focusing control is carried out from the same side only for a layer jump to a layer on the initial position side at the time of immediately preceding focusing control.

5. A focus search method for a digital disk according to claim 4, wherein focusing control is started from an outer side of a recording layer close to a specified layer at the time of starting up the digital disk.

6. A focus search method for a digital disk according to claim 5, wherein, if the digital disk has a single recording layer, focusing control is started from a predetermined side at the time of a startup.

7. A focus search method for a digital disk, comprising the steps of:
   bringing a focus of an emitted light beam close to a recording layer from an outer side of any of the recording layers of a digital disk in which a plurality of recording layers are formed;
   receiving a reflected light beam from the digital disk;
   carrying out control to focus the received light beam on a specified layer; and
   performing a layer jump in response to an instruction indicating a layer change;
   wherein, if a layer jump has been performed improperly, then an exclusive logical OR of a flag corresponding to a focusing direction and a flag corresponding to a layer specified for a jump is computed to set a next focusing direction.

8. A focus search method for a digital disk according to claim 7, wherein focusing control is started from an outer side of a recording layer close to a specified layer at the time of starting up the digital disk.

9. A focus search method for a digital disk according to claim 8, wherein, if the digital disk has a single recording layer, focusing control is started from a predetermined side at the time of a startup.

10. A focus search method for a digital disk, comprising the steps of:
    first focusing an emitted light beam at an initial position at an outer side of either of two recording layers of a digital disk in which a plurality of recording layers are formed;

moving the focus close to a recording layer side to receive a reflected light beam from the digital disk;

carrying out control to focus the received light beam on a specified layer; and performing a layer jump in response to an instruction indicating a layer change;

wherein, if a layer jump has been performed improperly, then an exclusive logical OR of a flag corresponding to an initial focus position and a flag corresponding to a layer specified for a jump is computed to set a next initial focus position.

11. A focus search method for a digital disk according to claim 10, wherein focusing control is started from an outer side of a recording layer close to a specified layer at the time of starting up the digital disk.

12. A focus search method for a digital disk according to claim 11, wherein, if the digital disk has a single recording layer, focusing control is started from a predetermined side at the time of a startup.

13. A focus search controller for a digital disk, comprising:

focusing control means for moving a focus of an emitted light beam close to a recording layer side from an outer side of either of two recording layers of a digital disk in which at least two recording layers, namely, a first layer and a second layer, are formed and for receiving a reflected light beam from the digital disk to carry out control to focus the received light beam on a specified layer; and layer jump means for performing a layer jump in response to an instruction indicating a layer change;

the controller further comprising layer jump control means for carrying out focusing control from the same direction only if a layer jump to the second layer has been improperly performed when an immediately preceding focus search was started from an outer side of the second layer, or only if a layer jump to the first layer has been improperly performed when an immediately preceding focus search was started from an outer side of the first layer.

14. A focus search controller for a digital disk according to claim 13, further comprising means for specifying an initial position at a startup that carries out focusing control from an outer side of a recording layer near a specified layer.

15. A focus search controller for a digital disk according to claim 14, wherein the means for specifying an initial position at a startup carries out focusing control from a predetermined side if the digital disk has a single recording layer.

16. A focus search controller for a digital disk, comprising:

focusing control means for focusing an emitted light beam first at an initial position on an outer side of either of two recording layers of a digital disk in which a plurality of recording layers are formed, and moving the focus close to a recording layer side so as to receive a reflected light beam from the digital disk and to carry out control to focus the received light beam on a specified layer; and layer jump means for performing a layer jump in response to an instruction indicating a layer change;

the controller further comprising layer jump control means for carrying out focusing control from the same side only for a layer jump to a layer on the initial position side during immediately preceding focusing control if an improper layer jump has taken place.

17. A focus search controller for a digital disk according to claim 16, further comprising means for specifying an initial position at a startup that carries out focusing control from an outer side of a recording layer near a specified layer.

18. A focus search controller for a digital disk according to claim 17, wherein the means for specifying an initial position at a startup carries out focusing control from a predetermined side if the digital disk has a single recording layer.

19. A focus search controller for a digital disk, comprising:

focusing control means for bringing a focus of an emitted light beam close to a recording layer from an outer side of any of the recording layers of a digital disk, in which a plurality of recording layers are formed, for receiving a reflected light beam from the digital disk, and for carrying out control to focus the received light beam on a specified layer; and layer jump means for performing a layer jump in response to an instruction indicating a layer change;

the controller further comprising focus direction setting means for computing an exclusive logical OR of a flag corresponding to a focusing direction and a flag corresponding to a layer specified for a jump to set a next focusing direction if a layer jump has been performed improperly.

20. A focus search controller for a digital disk according to claim 19, further comprising means for specifying an initial position at a startup that carries out focusing control from an outer side of a recording layer near a specified layer.

21. A focus search controller for a digital disk according to claim 20, wherein the means for specifying an initial position at a startup carries out focusing control from a predetermined side if the digital disk has a single recording layer.

22. A focus search controller for a digital disk, comprising:

focusing control means for focusing an emitted light beam first at an initial position on an outer side of either of two recording layers of a digital disk, in which a plurality of recording layers are formed, for moving the focus close to a recording layer side so as to receive a reflected light beam from the digital disk, and for carrying out control to focus the received light beam on a specified layer; and layer jump means for performing a layer jump in response to an instruction indicating a layer change;

the controller further comprising:

means for setting a first flag corresponding to an initial position of the focus;

means for setting a second flag corresponding to a layer specified for a jump;

arithmetic means for computing an exclusive logical OR of the two flags; and initial focus position setting means for setting a next initial focus position on the basis of the computation result.

23. A focus search controller for a digital disk according to claim 22, further comprising means for specifying an initial position at a startup that carries out focusing control from an outer side of a recording layer near a specified layer.

24. A focus search controller for a digital disk according to claim 23, wherein the means for specifying an initial position at a startup carries out focusing control from a predetermined side if the digital disk has a single recording layer.

* * * * *